United States Patent [19]
Fujiie et al.

[11] Patent Number: 4,924,455
[45] Date of Patent: May 8, 1990

[54] APPARATUS FOR GENERATING TRACKING ERROR SIGNALS IN A DIFFERENTIAL PHASE DETECTION SYSTEM

[75] Inventors: Kazuhiko Fujiie, Tokyo; Chiaki Nonaka; Tadao Yoshida, both of Kanagawa, all of Japan

[73] Assignee: Sony Corporation, Tokyo, Japan

[21] Appl. No.: 599,731

[22] Filed: Apr. 12, 1984

[30] Foreign Application Priority Data

Apr. 14, 1983 [JP] Japan ............................ 58-65853

[51] Int. Cl.[5] ............................ G11B 7/12; G11B 7/09
[52] U.S. Cl. .............................. 369/44.21; 369/44.11; 250/202
[58] Field of Search ...................... 369/44–46, 369/32–33, 109, 120; 358/342; 250/201 DF, 202

[56] References Cited

U.S. PATENT DOCUMENTS

| 4,011,400 | 3/1977 | Simons et al. | 369/46 |
| 4,059,841 | 11/1977 | Bricot et al. | 369/46 |
| 4,268,745 | 5/1981 | Okano | 369/46 |
| 4,273,998 | 6/1981 | Kanamaru | 369/46 |
| 4,290,132 | 9/1981 | Kotaka | 369/46 |
| 4,293,944 | 10/1981 | Izumita et al. | 369/45 |
| 4,410,969 | 10/1983 | Maeda | 369/46 |
| 4,467,462 | 8/1984 | Shibata | 369/44 |
| 4,501,493 | 2/1985 | Kubota | 369/45 |
| 4,525,825 | 6/1985 | Ito et al. | 369/46 |
| 4,541,082 | 9/1985 | Horikoshi et al. | 369/44 |
| 4,541,084 | 9/1985 | Oku et al. | 250/201 DF |
| 4,542,491 | 9/1985 | Takasugo et al. | 369/45 |

Primary Examiner—Alan Faber
Assistant Examiner—James E. Tomassini
Attorney, Agent, or Firm—Lewis H. Eslinger; Jay H. Maioli

[57] ABSTRACT

A tracking servo signal is generated for use in an optical disc pick-up system, being particularly advantageous for use when the depth of the pits is greater or less than one-fourth the wavelength of the light beam used to read the disc, in which case diffraction patterns formed by reflected light beams are not symmetric on a photo-detector and typically result in DC-shifted tracking error signals. A first tracking error signal is generated from selected output signals of a number of light-receiving areas of the photo-detector and a second tracking error signal is generated by combining output signals from these light-receiving areas in a pattern different than that used in generating the first tracking error signal. These two tracking error signals are combined so that the resultant signal forms a tracking servo signal that has substantially no DC component.

18 Claims, 7 Drawing Sheets (A1)

(A2)

(A3)

(B1)

(B2)

(B3)

(C1)

(C2)

(C3)

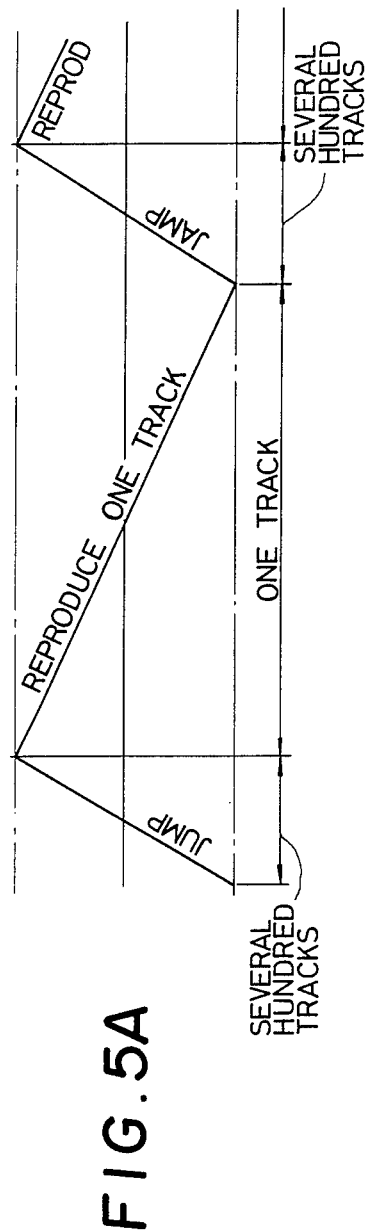
FIG. 5A
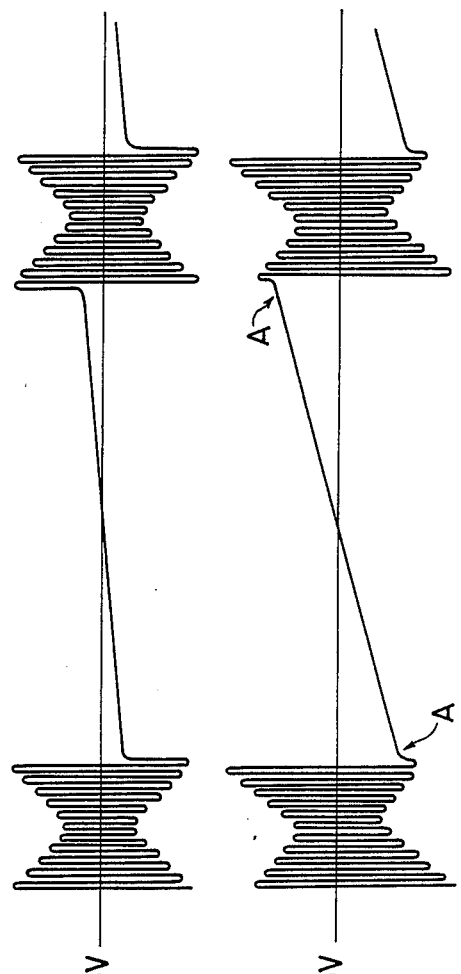
FIG. 5B
FIG. 5C

APPARATUS FOR GENERATING TRACKING ERROR SIGNALS IN A DIFFERENTIAL PHASE DETECTION SYSTEM

BACKGROUND OF THE INVENTION

1. Field of the Invention

This invention relates generally to a tracking servo system and, more particularly, to a tracking servo system for use with an optical pick-up that extracts an information signal from an optical record medium.

2. Description of the Prior Art

Information reproduction systems are now becoming well known in which the information medium is a disc having the information arranged thereon as an array of pits in the disc surface. The information on the disc is read by a light beam and, thus, is generally known as an optical disc. Typically, the light beams are emitted from a semiconductor laser source and focussed to a small spot size in accord with the quite small size of the pits formed in the optical disc. The disc is rotated and the light beam caused to scan the surface, with the modulated reflections of the light beam from the disc then being received by a photo-detector and processed to reproduce the desired information signal. The pits are generally formed having a depth which is some fraction of the wavelength of the light beam and, typically, the pit depth is chosen as one-fifth, one-fourth, or one-third the wavelength of the monochromatic light beam from the laser.

It is known to generate servo control signals to control tracking or scanning of the light beam by using the photo-detector upon which the reflected light forms a diffraction pattern and which provides the reproduced information signal. Using known servo-control techniques, a tracking error signal is used to drive the light beam into alignment with the pits on the record medium surface. One approach in generating the tracking error signal is to divide the photodetector into individual light receiving areas and then to take off the signals from each area in various combinations to produce a differential tracking error signal. This approach to producing a tracking error signal is generally referred to as differential phase detection (DPD). Typically, the diffraction pattern formed on the photo-detector is symmetric with the center of the coordinates of the multiple light-receiving areas. Problems arise in this tracking error system when the depth of the pits in the disc is changed from one-fourth wavelength to, for example, one-fifth or one-third the wavelength of the scanning light beam, which is evidenced by the diffraction pattern losing symmetry along a line dividing the light-receiving areas in a direction normal to the tracking direction. This results in a DC component that is included in the tracking error signal as a difference between selected pairs of receiving areas of the photo-detector used in DPD tracking. The magnitude of this DC component then changes as the diffraction pattern moves over the various areas of the light-receiving surface of the photo-detector. This DC component that is present when the pit depth is one-fifth of a wavelength is particularly troublesome during a random access operation, where the light beam jumps over several hundreds of tracks to a specific track. In that case, when the tracking error signal has a DC level at the start of the "read" time portion of the tracking control signal, false tracking errors are caused that result in unsteady operation and improper jumping.

Another situation in which the DC component in the tracking error signal is problematic is when a strong external shock is imparted to the tracking servo device, in which case the tracking servo device tends to oscillate at a specific resonant frequency. This comes about because in this kind of optical disc system, even though the tolerance of the positional deviation of the information tracks relative to the center of the optical disc during the manufacturing process, or at the time of "cutting" the optical disc, is held within a range of about 130 microns, this small amount of error causes an increase in the tracking error when the low-frequency gain is low. In order to prevent this, the low-frequency gain of the servo system is generally increased and appropriate phase compensation is provided. Thus, when a DC component is present in the tracking error signal, as might occur in the above situations, the conditions for oscillation (and instability) are established when the random access mode is being used or when a strong external shock acts on the system. Such conditions for oscillation may be typified by an open-loop transfer function gain of the servo system of unity and a phase shift of 180° at the resonant frequency of the oscillation. This results in the tracking servo system commencing to oscillate and, in such case, oscillation continues and the tracking servo signal has a waveform with a substantially discernible resonant frequency.

OBJECTS AND SUMMARY OF THE INVENTION

Accordingly, it is an object of the present invention to provide a tracking servo circuit for an optical pick-up that can eliminate the above-noted defects inherent in the prior art.

Another object of the invention is to provide an improved tracking servo circuit for an optical pick-up, wherein a beam spot jump and subsequent settling in a random access mode can be performed in a stable fashion and no oscillations occur in the tracking servo signal, even if an external mechanical shock acts on the tracking servo device.

A further object of this invention is to provide an improved tracking servo circuit for an optical pick-up, in which tracking servo signals are produced from a photo-detector having a number of separate active areas and which also provides the reproduced information signal.

In accordance with an aspect of the present invention, there is provided in a tracking servo circuit for an optical pick-up of the kind having a light source for transmitting a light beam through a focusing lens onto a surface of the optical record medium where the information tracks are arranged, a photo-detector for receiving the diffraction pattern formed by the light reflected from the surface of the record medium, and a tracking servo device for controlling the position of the focusing lens in a tracking direction in response to a tracking servo signal so as to trace the information tracks, in which the photo-detector comprises four separate light-receiving areas. The tracking servo circuit comprises a first tracking-error detecting circuit to detect a first tracking error signal in response to the outputs of selected ones of the four light-receiving areas and a second tracking-error detecting circuit to detect a second tracking-error signal in response to outputs of selected other ones of the four light-receiving areas and an operational circuit that produces a tracking servo signal by a mathematical operation on the first and second tracking-error signals, such that any DC component included in the first tracking-error signal is removed.

The above and other objects, features and advantages of the present invention, will become apparent from the following detailed description of illustrative embodiments to be read in conjunction with the accompanying drawings, in which like reference numerals represent like elements.

BRIEF DESCRIPTION OF THE DRAWINGS

FIGS. 3(B1)–(B3) represent dark portions and projection images formed as diffraction patterns by the reflected beams incident on the light receiving portion of the photo-detector when the pits in the record medium have a depth of one-fourth wavelength of the light beam;

FIGS. 3(C2)–(C3) represent dark portions and projection images formed as diffraction patterns by the reflected beams incident on the light receiving portion of the photo-detector when the pits in the record medium have a depth of one-fifth wavelength of the light beam;

FIG. 5A represents a scanning state of the objective element in a random access mode;

FIGS. 5B and 5C represent the waveforms of tracking servo signals in a random access mode when the depth of the pit is one-fourth wavelength and one-fifth wavelength, respectively.

DETAILED DESCRIPTION OF PREFERRED EMBODIMENTS

Figure 1:
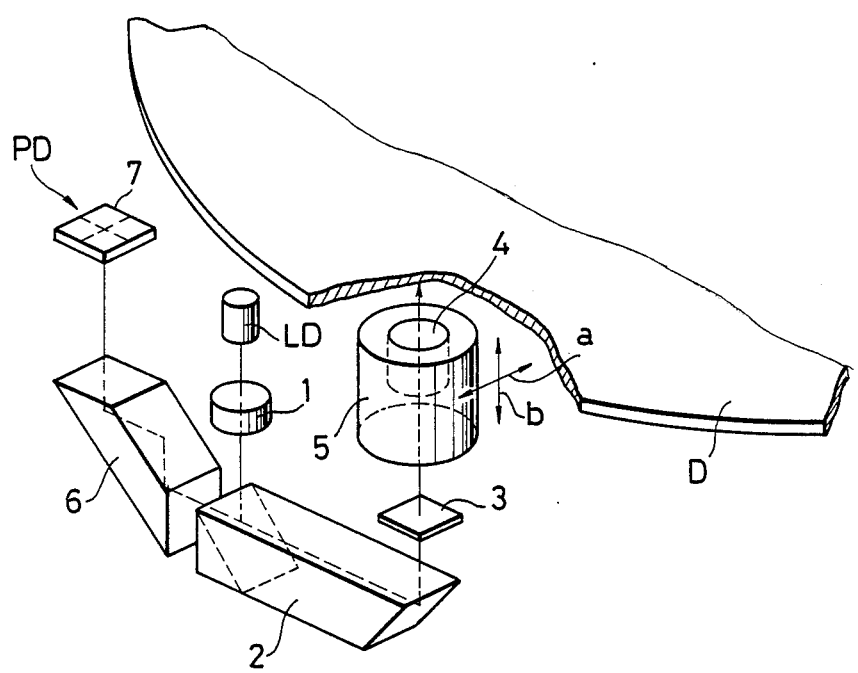
FIG. 1 schematically illustrates an optical pick-up system with which the present invention can be used.

In the optical system of FIG. 1, a conventional optical pick-up system employs light beams emitted from a semiconductor laser LD, such as a laser diode, incident on a collimator lens 1 that collimates the laser light beam and transmits the collimated light rays to a polarization prism 2. The collimated and polarized laser light beam is transmitted by the polarization prism 2 through a quarter-wave plate, that introduces a phase difference of one-quarter cycle or in other words rotates the polarized light by 90° from the polarization axis. The rotated and collimated light beam is focused by objective element 4 into a beam spot of a small size onto a signal surface of optical disc D, which comprises the optical recording medium.

As is known, the optical disc D is formed having helical or concentric tracks or pre-grooves formed in the signal surface, and the tracks contain an array of pits modulated by either video information, audio information, or both audio and video information. The objective element 4 is mounted by actuator 5 so as to be movable in a radial direction, that is, in a tracking direction a, on optical disc D and also in focusing direction b, in which the objective element 4 moves toward and away from the signal surface of optical disc D. Actuator 5 is controlled by a tracking servo signal generated from a tracking servo circuit (not shown) and is also controlled by a focus servo signal generated by a focus servo circuit (also not shown), in such a fashion that objective element 4 is moved in the tracking direction a in response to the tracking servo signal and is moved in the focusing direction b in response to the focus servo signal. Accordingly, servo control is performed in such a fashion that the light beam spot is focused on the signal surface of optical disc D and is caused to properly track in the radial direction.

Figure 2:
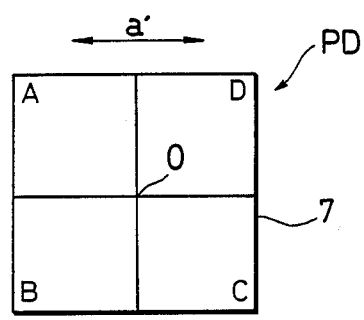
FIG. 2 schematically illustrates a photo-detector, shown in the system of FIG. 1 being divided into four separate light-receiving areas.

Light beams reflected from the signal surface of optical disc D are incident on the objective element 4 and are passed back through quarter-wave plate 3 through polarizer 2 and to critical-angle-setting prism 6, so as to form a diffraction pattern incident on the light-receiving surface PD of a photo-detector 7. The light-receiving portion PD of photo-detector 7 is divided into four separate and distinct light-receiving areas A,B,C, and D, respectively, as shown generally in FIG. 2. The center 0 of the photo-detector portion PD is at the intersection of the dividing lines that form the four areas A,B,C and D, and is aligned with the optical axis of the reflected light beam. The four areas on the surface area PD of photo-detector 7 are arranged in alignment with the radial tracking direction a, as shown by the arrow a' in FIG. 2.

Figure 3:
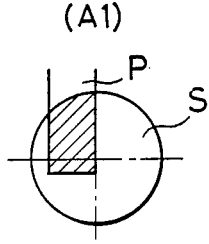
FIGS. 3(A1)–(A3) illustrate the mutual relationship between a pit on a record medium and a light beam spot for reading thereof.
Figure 3:
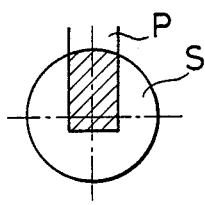
Figure 3:
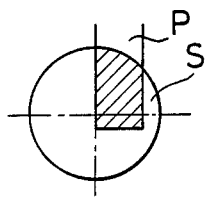
Figure 3:
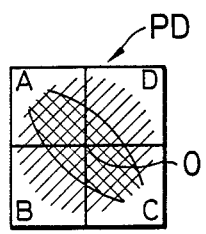
Figure 3:
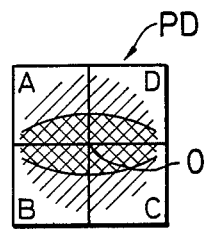
Figure 3:
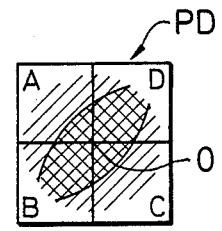
Figure 3:
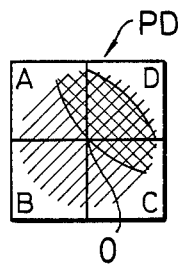
Figure 3:
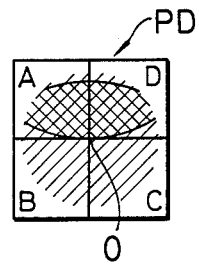
Figure 3:
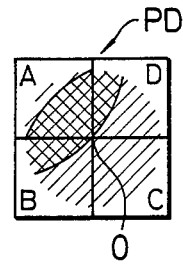

As an example of the operation of the light-receiving portion PD of photo-detector 7, when the depth of a pit P formed in the optical disc D corresponds to one-fourth wavelength of the light beam, a reproduced information signal, $S_0=S_A+S_B+S_C+S_D$, which comprises a sum of the outputs generated from the four light receiving areas A–D, respectively, is produced. At the leading edge of this information signal, the dark portions caused by the scanning of a pit P by a spot S, as represented in FIGS. (A1)–(A3), results in dark portions and so-called projection images formed as diffraction patterns by the reflected beams incident on the light receiving portion PD of photo-detector 7. The dark portions corresponding to the pits P are represented as the double-hatched areas that appear to be superimposed on the single-hatched areas, which represent the projection images produced by reflection of the light beam from the optical disc surface, as represented in FIGS. 3(B1)–(B3). FIGS. 3(A1),(A2), and (A3) relate to the displacement of the light beam spot S to the right of pit P, aligned with the center of pit P, and displaced to the left of pit P, respectively. These various relationships between the pit P and the beam spot S result in the corresponding projection images and dark portions of FIGS. 3(B1),(B2), and (B3), respectively. That is, when the beam is displaced to the right of the pit, the dark portion is skewed along an upper left to lower right diagonal in relation to the four areas of photo-detector PD. When the beam spot S is aligned with pit P, the dark portion is aligned along the horizontal center axis of photo-detector PD, and when the beam spot is displaced the left of pit P, the dark portion is skewed along the diagonal from the upper right to the lower left of the four areas of photo-detector PD. Note that the dark portions are always symmetric with the origin O of the photo-detector PD. While the above relationships are present at the leading edge of the output signal, a similar sitation exists at the trailing edge of the output information signal $S_0$, where the dark portions are again formed in a symmetrical fashion with respect to the origin O of the four areas of the photo-detector PD.

As may be seen from FIGS. 3(A1)–(A3) and FIG. 3(B1)–(B3), the dark portions on the photo-detector caused by the pits change in position in accordance with the extent of misalignment between the pit P and the light beam spots and, thus, upon observing this, a tracking error signal can be obtained by taking the difference between selected ones of the different areas on the photo-detector surface. More specifically, a tracking error signal $S_T = (S_A + S_C) - (S_B + S_D)$ can be obtained, which represents a difference between a sum of outputs from a pair of diagonally opposing light receiving areas A and C and a sum of outputs from a pair of diagonally opposing light-receiving B and D. This tracking error signal is obtained at time points corresponding to either the rising or falling edges of the total output signal $S_0$. This is the kind of tracking servo system generally referred to as the differential phase detection (DPD) scheme. Differences ($S_{T1}$ and $S_{T2}$) between the sum of outputs from the pair of diagonally opposing light-receiving areas A and C and the sum of outputs from the other pair of diagonally opposing light-receiving areas B and D at the leading and trailing edges of the signal $S_0$ may be obtained. In this case, the difference signal ($S_{T1} - S_{T2}$) is used as the tracking error signal.

In the case where the depth of the pit P formed on the optical surface of the disc D has a depth corresponding to one-fifth wavelength of the light beam used to read the information formed on the disc, dark portions representing the pits will be positioned in relation to the spots reflected from the disc, as represented in FIGS. 3(C1),(C2), and (C3). These figures correspond to the misalignment and centering relations between the beam spot S and the pit P in the optical record surface D at the leading edge of the output signal $S_0$ from photo-detector 7, as represented in FIGS. 3(A1)–(A3). Note that in this situation, where the pit depth is one-fifth wavelength of the light beam, the dark portions represented by the double cross-hatching are not symmetrical along the dividing line of light-receiving areas normal to tracking direction a′, and this result obtains both at the leading edge and trailing edge of the output signal $S_0$.

In this manner, when the dark portions are not symmetrical about the origin 0, a DC component is included in the tracking error signal obtained from the difference between the sum of the outputs from the diagonal pair of light receiving areas A and C and the sum of outputs from the other diagonal pair of light receiving areas B and D. Moreover, the magnitude of the this DC component will change when the projection image caused solely by the beam reflection by the disc, shown as the single-hatched circular area on the photo-detector, moves on the surface of the light receiving portion PD of the photo-detector 7. In the instant example, it is assumed that the projection image formed by spot S moves in the direction from left to right in the photo-detector of FIG. 2, as the objective element 4 crosses from one end to the other along the radial track direction a.

Figure 4A:
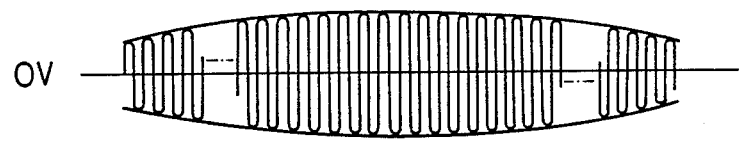
FIGS. 4A and 4B represent waveforms of a tracking error signal in which the depth of the pits in the record medium is one-fourth wavelength and one-fifth wavelength of the light beam, respectively.
Figure 4B:
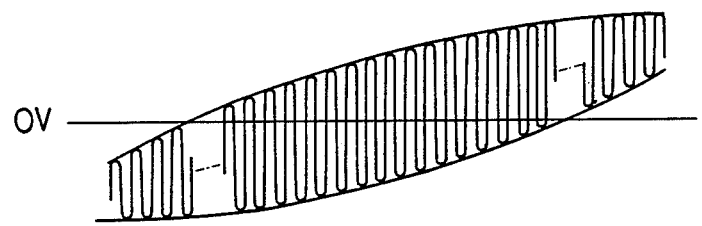

The waveform of a tracking error signal obtained as the difference between $S_{T1}$ and $S_{T2}$, when the depth of the pit is one-fourth wavelength of the light beam, is represented in FIG. 4A. Similarly, the waveform of a tracking error signal obtained as the difference between $S_{T1}$ and $S_{T2}$, when the depth of the pit in the record medium surface is one-fifth wavelength of the light beam, is represented in FIG. 4B. As may be seen from comparing FIGS. 4A and 4B, when the depth of the pit is one-fourth the light beam wavelength, even if the projection image is moved slightly in the right to left direction upon movement of the objective element 4, no DC component is included in the tracking error signal, since the tracking error signal waveform in FIG. 4A is symmetric about the zero voltage axis. Nevertheless, in the case where the depth of the pit is one-fifth wavelength of the light beam, there will be a DC component in the corresponding tracking error signal, as represented by the skewing of the waveform envelope shown in FIG. 4B. Moreover, the magnitude of this DC component will change upon movement of the objective element 4. When the tracking error signal $S_T$, or more accurately $(S_{T1} - S_{T2})$, is used as the tracking servo signal with no modification, the problems discussed hereinafter will occur. In the examples illustrated hereinbelow, the depth of the pit P in the optical surface of the record medium D is assumed to be one-fifth the wavelength of the light beam.

A typical mode of operation in this type of optical disc system is to provide random access of the pick-up to any location on the surface of the optical disc. This random access operation is typically performed by repeating a stepping access to the pick-up, so that the beam spot jumps over several hundreds of tracks and then an address of the jump track is read out. Nevertheless, jumping cannot be performed in a stable manner due to an interference caused by this DC component. FIG. 5A is a typical servo control signal for the random access mode, as might be fed to actuator 5 of FIG. 1, in which the objective element 4 is rapidly moved from one end, in this example the left end, to the other end, that is to the right end, along tracking direction a, in order to cause the beam spot to jump over several hundreds of tracks without reproducing such tracks. In this mode, typically the data is read out from a track while the beam spot is being reset from one end to the other end, that is, from right to left. In such case, the tracking error signal will have a waveform represented in FIG. 5C, however, the ideal waveform for the tracking error signal is shown in FIG. 5B. Attention is particularly directed to the portion of the waveform at A in FIG. 5C and a comparison with the corresponding location in the desired waveform of FIG. 5B indicates that a substantial DC component is present in the tracking error signal at such locations. False tracking errors will thereby be caused by the DC component which occurs at these portions of the tracking error signal indicated by arrows A, even if the proper tracking state is maintained, thereby resulting in unstable operation and hence improper jumping.

Figure 6A:
FIGS. 6A and 6B represent waveforms of tracking servo signals in a stable system and in an oscillating system, respectively.
Figure 6B:
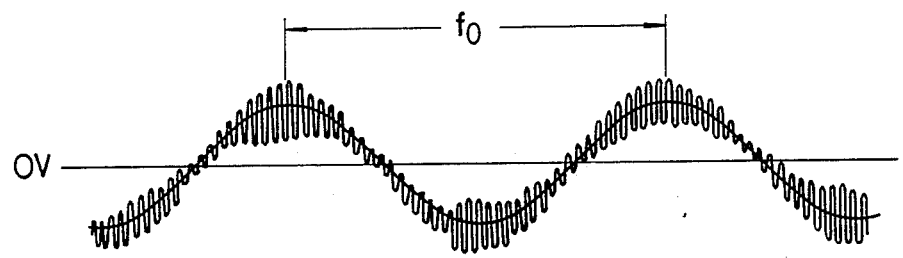

Another problem presented by this DC component in the tracking error signal in addition to the track jumping operation is when a strong external mechanical shock acts upon the tracking servo device. This results in the tracking servo tending to oscillater at a resonant frequency $f_0$. As mentioned, in apparatus of this kind there is a tolerance of about 130 microns on the positional deviation of the center of the optical disc D during the manufacturing process or at the time of replaying. Accordingly, because of this tolerance when a low-frequency gain is low, tracking error will be increased. The typical approach to preventing this increase in tracking error is to raise the low-frequency gain of the servo circuit, and also to provide phase compensation. Thus, when a DC component is present in the tracking error signal, the conditions for oscillation are established when the random access mode is set or when a strong external shock acts on the servo system. In this system, the conditions for oscillation are when an open-loop, transfer-function gain of the servo system is unity and the phase is shifted by 180° at the resonant frequency $f_0$. As a result, the tracking servo system will go into oscillation and the tracking servo system has a waveform with a resonant frequency $f_0$, as represented in FIG. 6B. An ideal tracking signal waveform is shown in FIG. 6A, and the difference with the resonating signal of FIG. 6B can be readily seen.

Figure 7:
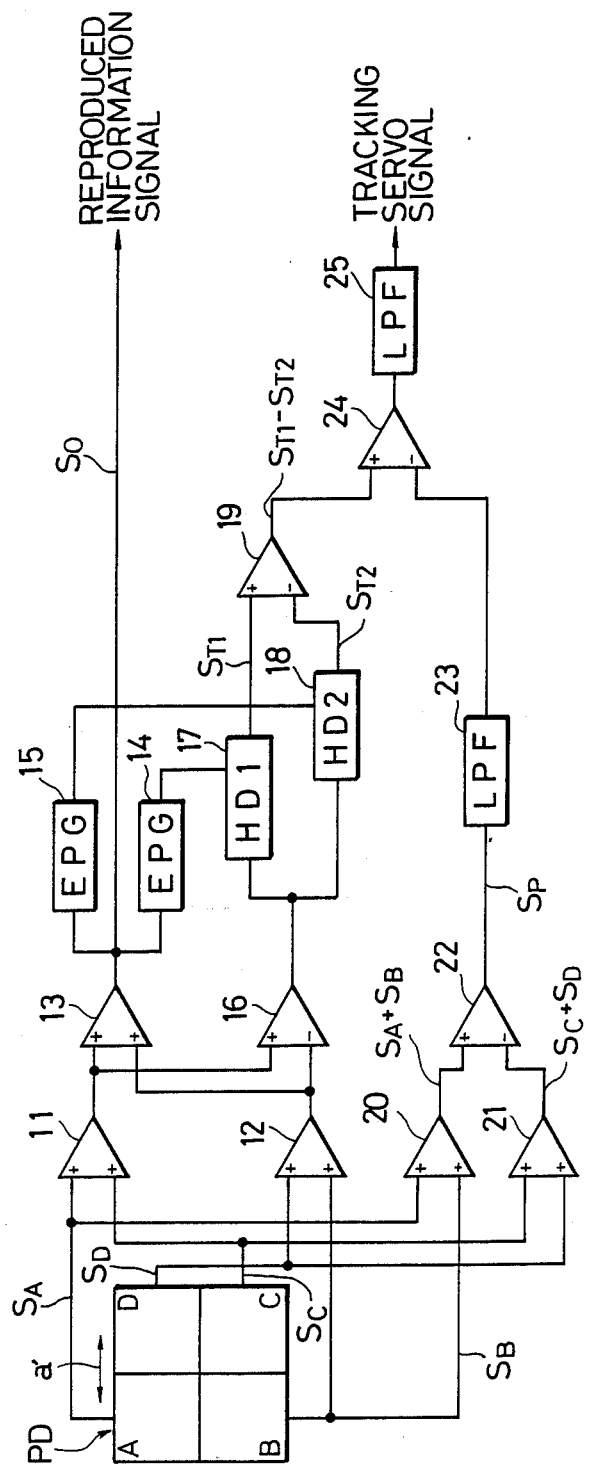
FIG. 7 is a block diagram illustrating a preferred embodiment of the tracking servo circuit for an optical pick-up system according to the present invention.

The present invention recognizes the above problems and provides a tracking control servo system that eliminates the DC components, which cause the above-described problems. More particularly, in FIG. 7, light receiving areas A,B,C, and D, which make up the light-receiving portion PD of the photo-detector 7, are arranged in the same fashion as in FIG. 2 with respect to a projected tracking direction a'. The output signals from the diagonally opposing light receiving areas A and C are fed to two input terminals of a first adder 11. Similarly, the output signals from the remaining diagonally opposing light-receiving areas B and D are fed to two input terminals of second adder 12. Output signals from first and second adders 11 and 12, respectively, are fed to inputs of third adder 13, thereby obtaining at the output of adder 13 a reproduced information signal $S_0 = S_A + S_B + S_C + S_D$. This signal $S_0$ is fed to trailing (or rising) edge pulse generator 14 and also to leading (or falling) edge pulse generator 15. Edge pulse generator 14 generates edge pulses at the leading edge of the information signal $S_0$, and edge pulse generator 15 generates edge pulses at the trailing edge of information signal $S_0$. A leading edge pulse is obtained when a spot S, as represented in FIG. 3A1–3A3, enters the areas of a pit, and a trailing edge pulse is obtained when the spot S leaves the area of a pit P.

The output signals from first and second adders 11 and 12 are fed, respectively, to two inputs of subtractor 16 and, specifically, the output signal from first adder 11 is fed to the plus input of adder 16 and the output signal from second adder 12 is fed to the minus input of subtractor 16. The output signal from subtractor 16 is fed to first sample-and-hold circuit 17 and to second sample-and-hold circuit 18. Sample-and-hold circuits 17 and 18 are controlled or enabled by output signals from the leading and trailing edge pulse generators, respectively. Specifically, the first sample-and-hold circuit 17 is controlled by the output signal from leading pulse edge generator 14, and second sample-and-hold circuit 18 is controlled by the output signal from trailing edge pulse generator 15. Outputs from sample-and-hold circuits 17 and 18, respectively, are fed to the inputs of subtractor 19 and, specifically, the output signal from sample-and-hold circuit 17 is fed to the plus input terminal of subtractor 19 and the output signal from second sample-and-hold circuit 18 is fed to the minus input of subtractor 19. These outputs from sample-and-hold circuits 17 and 18 comprise sampled tracking error signals $S_{T1}$ and $S_{T2}$, respectively, at the leading and trailing edges of signal $S_0$ and are obtained in accordance with the difference $[(S_A + S_C) - (S_B + S_D)]$ between the sum of the outputs from the diagonal pair of light-receiving areas A and C and the sum of the outputs from the other diagonal pair of light-receiving areas B and C of the light-receiving portion PD of photo-detector 7. Thus, a tracking error signal $(S_{T1} - S_{T2})$ is obtained at the output of subtractor 19 and corresponds to a servo signal obtained in accordance with the DPD scheme described hereinabove.

Referring to the four separate light-receiving areas of the light-receiving portion PD of photo-detector 7, output signals from an adjacent pair of light-receiving areas A and B are fed to input terminals of fourth adder 20, and output signals from another pair of adjacent light-receiving areas C and D are fed to the input terminals of fifth adder 21. Output signals from fourth and fifth adders 20 and 21, respectively, are fed to inputs of subtractor 22 and, specifically, the output signal from the fourth adder 20 is fed to the plus input of subtractor 22 and the output signal from the fifth adder 21 is fed to the minus input of subtractor 22. The output signal of subtractor 22 then represents a push-pull error signal $S_P = (S_A + S_B) - (S_C + S_D)$. This push-pull error signal $S_P$ can be used as a tracking servo signal where the pit depth is one-fourth wavelength of the light beam. The output signals from the selected pairs of light receiving areas of the photo-detector are balanced when proper tracking is achieved. Nevertheless, when the beam spot deviates either to the right or left with respect to the center line of the pairs, the output from one pair will become greater than that from the other pair. By utilizing a difference between the outputs from the pairs, proper tracking servo control is performed.

In this embodiment according to the present invention, the push-pull error signal $S_P$ represents a displacement error of the diffraction pattern formed by reflected beam incident on the light-receiving portion PD of photo-detector 7 along the tracking direction a'. The output signal from subtractor 22 is passed through low-pass filter (LPF) 23, which produces an output signal substantially resembling the DC component. This component from low-pass filter 23 is fed to the minus input of subtractor circuit 24. Similarly, the output signal from subtractor 19, which represents the DPD signal, is fed to the positive input of subtractor 24. Subtractor 24 generates a tracking servo signal that is supplied to the actuator 5, which controls the movement of objective element 4 along tracking direction a.

Figure 8A:
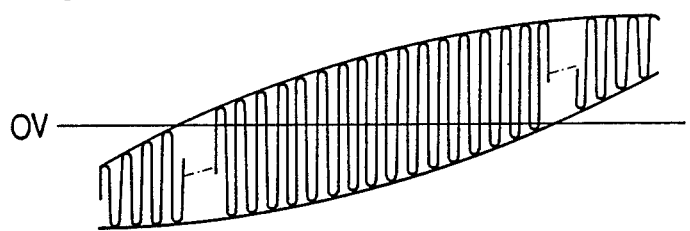
FIGS. 8A and 8B represent a waveform of a tracking error signal and a waveform of a push-pull error signal, respectively.
Figure 8B:
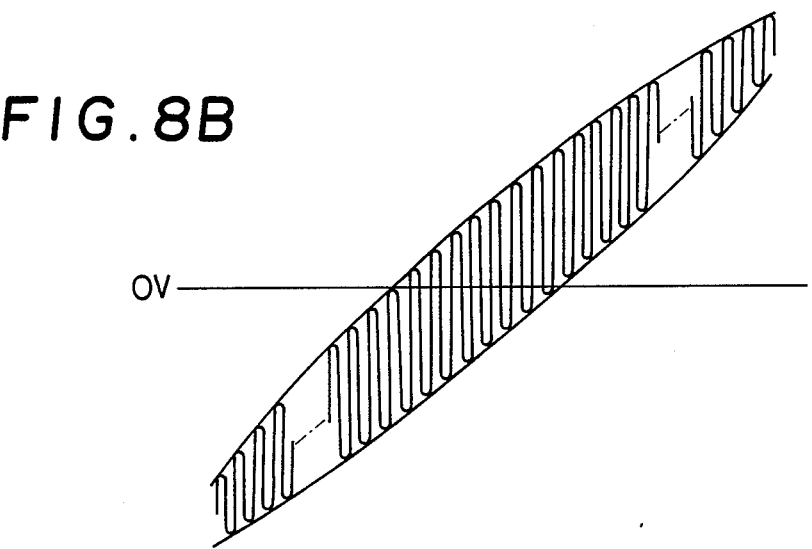
Figure 8C:
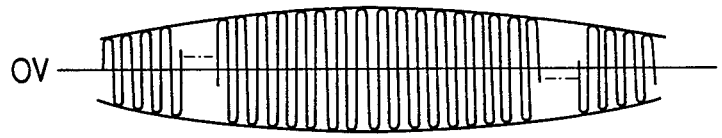
FIG. 8C represents a waveform of a tracking servo signal produced according to the present invention.

For example, when the depth of pits P in the record surface D is one-fifth the wavelength of the light beam and the objective element 4 is radially moved to view or scan these pits along tracking direction a of optic disc D, the waveform of the tracking error signal $(S_{T1} - S_{T2})$ produced by subtractor 19 will be as shown in FIG. 8A, and the waveform of the push-pull error signal $S_P$ produced by subtractor 22 will be as shown in FIG. 8B. When the depth of the pit is selected to be one-fifth the wavelength, the push-pull error signal $S_P$ is subtracted from the tracking error signal $(S_{T1} - S_{T2})$ in subtractor 24, thereby obtaining a tracking servo signal having no DC component, as represented by the tracking control signal in FIG. 8C. In other words, the DC component included in the tracking error signal $(S_{T1} - S_{T2})$ is removed by subtracting from it the push-pull error signal $S_p$. The tracking servo signal from subtractor 24 is fed to actuator 5 through low-pass filter 25, which filters the signal in order to emphasize the low-frequency component. In the case when the depth of the pit P is selected to be one-third the wavelength of the light beam, subtractor 24 is replaced by an adder.

It has been found that in practice when the depth is one-fifth the push-pull error signal should be subtracted from the tracking error signal in subtractor 24 with a ratio of 1.3/0.3. This ratio will change when the pit depth is one-eigth beam wavelength or one-sixth wavelength, for example. Subtractor 24 can comprise an operational amplifier and the subtraction ratio can be controlled in the typical fashion by choosing specific resistance values accordingly.

Furthermore, the push-pull error signal $S_P$ can be used to correct the offset DC component when the difference $S_T$ between the sum of output signals from the diagonal pair of light-receiving errors A and C and the sum of output signals from the diagonal pair of light-receiving errors B and D is sampled at the leading or trailing edge of the reproduced information signal $S_0$ to obtain the tracking error signal.

Accordingly, it will be seen that by following the teaching of the invention described above, there are significant advantages provided when the depth of the pit is set to be other than one-fourth wavelength. The DC component generated when the objective element is moved along the tracking direction or is inclined with respect thereto, which is a problem when using the DPD tracking error approach, is removed by using the push-pull error signal. Thus, any DC component that may be present will not be erroneously detected to be a tracking error.

When the random access mode is performed and the objective element is moved over the entire view along the tracking direction and reset at a beam jump start position, with the address information being reproduced from a track, and then the beam spot jumps over several hundred tracks, the jump and subsequent settle are performed in a stable fashion, because the DC component is removed from the tracking error signal. In addition to this advantage, and unlike conventional tracking servo systems wherein the open-loop transfer gain of the servo system is unity, when an external mechanical shock occurs, which normally results in the tracking servo system oscillating in a resonant frequency $f_0$, the tracking servo circuit of the present invention, however, is operated stably even in the face of such external mechanical shock.

Although illustrative embodiments of the present invention have been described in detail above with reference to the accompanying drawings, it is to be understood that the invention is not limited to those precise embodiments, and that various changes and modifications can be effected therein by one skilled in the art without departing from the scope or spirit of the invention, as defined by the appended claims.

What is claimed is:

1. Apparatus for producing a tracking servo signal of the differential phase detection kind for use in an optical pickup system of the kind having a light source emitting a light beam focused onto a record medium surface on which is formed an information track having an array of pits, a tracking servo device for causing the light beam to trace the track in a tracking direction in response to the tracking servo signal, and a photo-detector for receiving light reflected by the record medium surface and having a plurality of light-receiving areas, said apparatus for producing the tracking servo signal comprising:

first tracking error detecting means receiving output signals from said plurality of light-receiving areas of said photo-detector for producing therefrom a first tracking error signal formed as a difference between first and second sums of output signals from selected ones of said plurality of light-receiving areas of said photo-detector;

second tracking error detecting means receiving output signals from said plurality of light-receiving areas of said photo-detector for producing therefrom a second tracking error signal formed as a difference between third and fourth sums of output signals from selected ones of said plurality of light-receiving areas of said photo-detector, said third and fourth sums being different than said first and second sums, respectively; and signal combining means connected to combine said first and second tracking error signals to form a tracking servo signal.

2. Apparatus for producing a tracking servo signal according to claim 1, in which said pits in said record medium have a depth of at least one-fourth that of the wavelength of said light beam, and in which said signal combining means comprises a signal adder for forming said tracking servo signal as the sum of said first and second tracking error signals.

3. Apparatus for producing a tracking servo signal according to claim 1, in which said pits in said record medium have a depth of less than one-fourth that of the wavelength of said light beam, and in which said signal combining means comprises a subtracting circuit for forming said tracking servo signal by subtracting said second tracking error signal from said first tracking error signal.

4. Apparatus for producing a tracking servo signal according to claim 1, in which said plurality of light-receiving areas of said photo-detector comprises four areas A, B, C, and D arranged so that A and D are adjacent and B and C are adjacent in the tracking direction and A and B are adjacent and D and C are adjacent in a direction transverse to the tracking direction, and said first tracking error detecting means includes means for operating on said output signals from said photo-detector to form said first tracking error signal as $(A+C)-(B+D)$, and further in which said second tracking error detecting means includes means for operating on said output signals from said photo-detector to form said second tracking error signal as $(A+B)-(C+D)$.

5. Apparatus for producing a tracking servo signal according to claim 4, in which said means for operating on said output signals from said photo-detector to form said first tracking error signal include adding circuits and a subtracting circuit for producing a first intermediate signal as $(A+C)+(B+D)$ and a second intermediate signal as $(A+C)-(B+D)$, first and second sample-and-hold means having signal inputs receiving said second intermediate signal, and first and second edge pulse generating means receiving said first intermediate signal and producing respective edge pulses fed to triggering inputs of said first and second sample-and-hold means, and the outputs of said first and second sample-and-hold means being combined in a subtraction circuit for forming said first tracking error signal.

6. Apparatus for producing a tracking servo signal according to claim 4, in which said means for operating on said output signals from said photo-detector to form said second tracking error signal includes first and second adder means connected to produce first and second sum signals (A+B) and (C+D), respectively, and subtraction means receiving said first and second sum signals for producing a difference signal (A+B)−(C+D) therefrom representing said second tracking error signal.

7. Apparatus for producing a tracking servo signal according to claim 6, in which said means for generating said second tracking error signal includes low-pass filter means receiving said difference signal for forming said second tracking error signal substantially as a DC signal.

8. A differential phase detection tracking servo signal circuit for an optical pick-up emitting a light beam through a focusing lens onto a surface of an optical record medium on which an information track is formed as a number pits in the surface thereof, including a photo-detector for receiving light reflected from the surface of the record medium, and a tracking servo device for controlling the position of the focusing lens in a tracking direction, in which the photo-detector comprises at least four light-receiving areas A, B, C, and D, in which A and D are adjacent and B and C are adjacent in the tracking direction and A and B are adjacent and D and C are adjacent in a direction normal to the tracking direction, said tracking servo circuit comprising:
first tracking error detecting circuit for detecting a first tracking error signal from output signals of said four light-receiving areas, said first tracking error signal being formed as (A+C)−(B+D);
second tracking error detecting circuit for detecting a second tracking error signal from output signals of said four light-receiving areas, said second tracking error signal being formed as (A+B)−(C+D); and
operational circuit means receiving said first and second tracking error signals and performing a combining operation thereon for producing said tracking servo signal.

9. A tracking servo signal circuit according to claim 8, in which the depth of said pits in the surface of the optical record medium is greater than one-fourth wave length of said light beam, and in which said operational circuit means comprises an adder for adding said first and second tracking error signals and producing said tracking servo signal as the sum thereof.

10. A tracking servo signal circuit according to claim 8, in which the depth of said pits in the surface of the optical record medium have a depth of at least one-fourth wave length of said light beam, and in which said operational circuit means comprises a subtraction circuit for subtracting said second tracking error signal from said first tracking error signal and producing said tracking servo signal as the difference therebetween.

11. Apparatus for producing a tracking servo signal of the differential phase detection kind for use in an optical disc system of the kind having an optical pick-up controlled by a tracking servo circuit to track information formed as pits in tracks on the record medium surface using a light beam that is reflected thereby to form a defraction pattern on a photo-detector formed as four light-receiving areas, each producing a corresponding output signal, said apparatus comprises:
first detector means having inputs connected to each of said four light-receiving areas of said photo-detector for combining said output signals therefrom in a first predetermined combination to form a first tracking error signal;
second detector means having inputs connected to said four light-receiving areas of said photo-detector for combining said output signals therefrom in a second predetermined combination to form a second tracking error signal; and
signal combining means for combining said first and second tracking error signals to form a tracking servo signal, whereby said optical pick-up tracks the information tracks on the record medium.

12. Apparatus according to claim 11, in which the pits in the record medium surface have a depth of at least one-fourth wavelength of the light beam, and in which said signal combining means comprises a signal adder for producing an output tracking servo signal representing the sum of said first and second tracking error signals.

13. Apparatus according to claim 11, in which the pits in the record medium surface have a depth of less than one-fourth wavelength of the light beam, and in which said signal combining means comprises a subtraction circuit for subtracting said second tracking error signal from said first tracking error signal.

14. Apparatus according to claim 11, in which said four light-receiving areas of said photo-detector are identified as A, B, C, and D and are arranged so that A and D are adjacent and B and C are adjacent in a tracking direction and A and B are adjacent and D and C are adjacent in a direction transverse to the tracking direction, and in which said first detector means includes means for generating said first tracking error signal as (A+C)−(B +D).

15. Apparatus according to claim 14, in which said first detector means for forming said first tracking error signal include means for producing sum and difference signals from outputs of said four light-receiving areas of said photo-detector, and first and second sample-and-hold means each receiving said difference signal and said sample-and-hold means each being triggered by leading and trailing edge pulses, respectively, of said sum signal, outputs of said sample-and-hold means being combined in a subtracting circuit to form said first tracking error signal.

16. Apparatus according to claim 14, in which said second detector means includes means for generating said second tracking error signal in response to output signals from said four light-receiving areas as (A+B)−(C +D).

17. Apparatus according to claim 16, in which said second detector means forming said second tracking error signal include first and second adder means connected to produce first and second sum signals (A+B) and (C+D), respectively, from said four light-receiving areas of said photo-detector and subtraction means receiving said first and second sum signals for producing a difference signal (A +B)−(C+D), thereby forming said second tracking error signal.

18. Apparatus according to claim 17, in which said second detector means further includes low-pass filter means for forming said second tracking error signal substantially as a DC signal.

* * * * *